May 10, 1932. C. G. WILDERSON 1,857,905
CONTROL MECHANISM
Filed June 18, 1930  3 Sheets-Sheet 1

INVENTOR
Clinton G. Wilderson
by his attorneys
Byrnes, Stebbins, Parmelee & Blenko

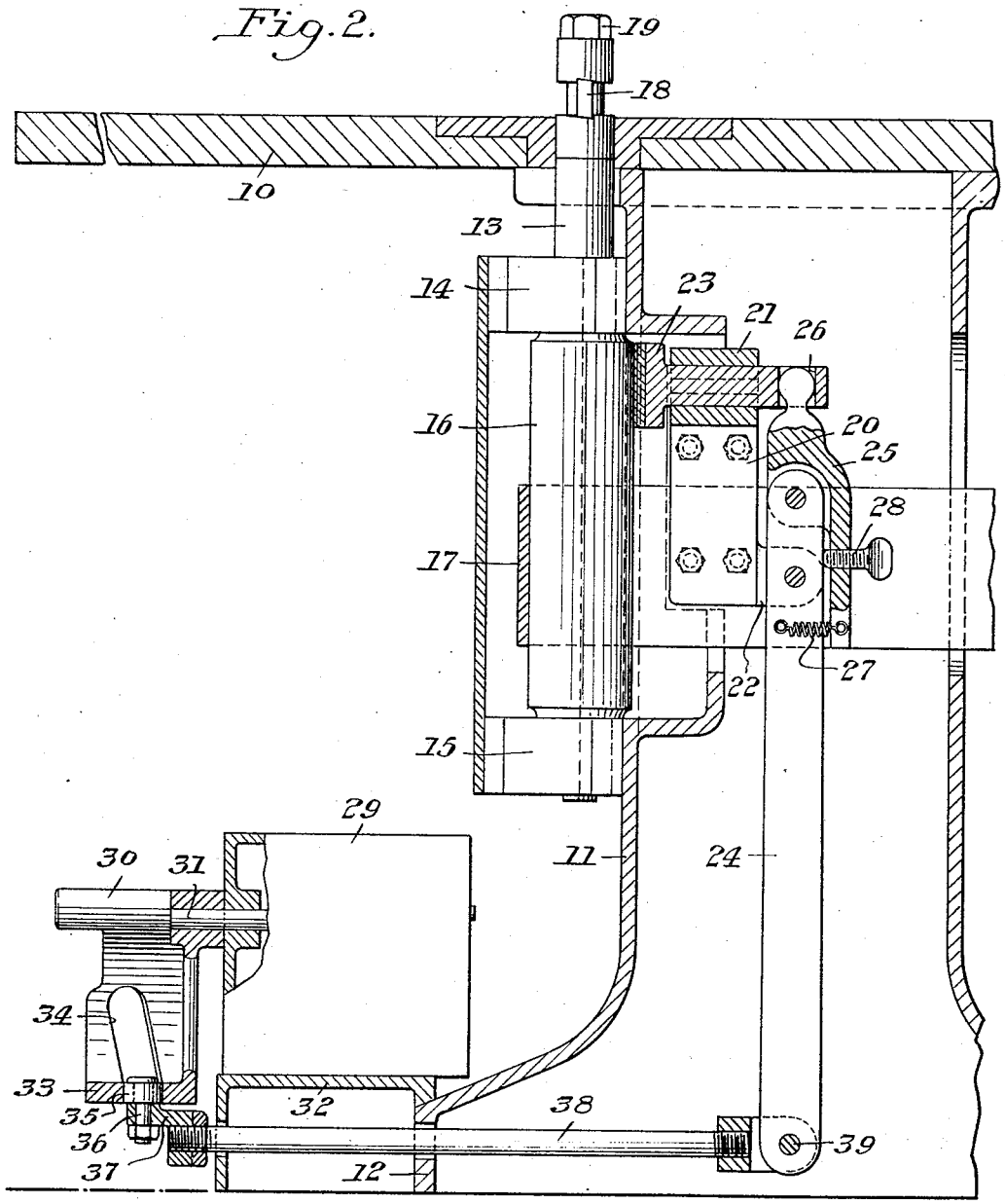

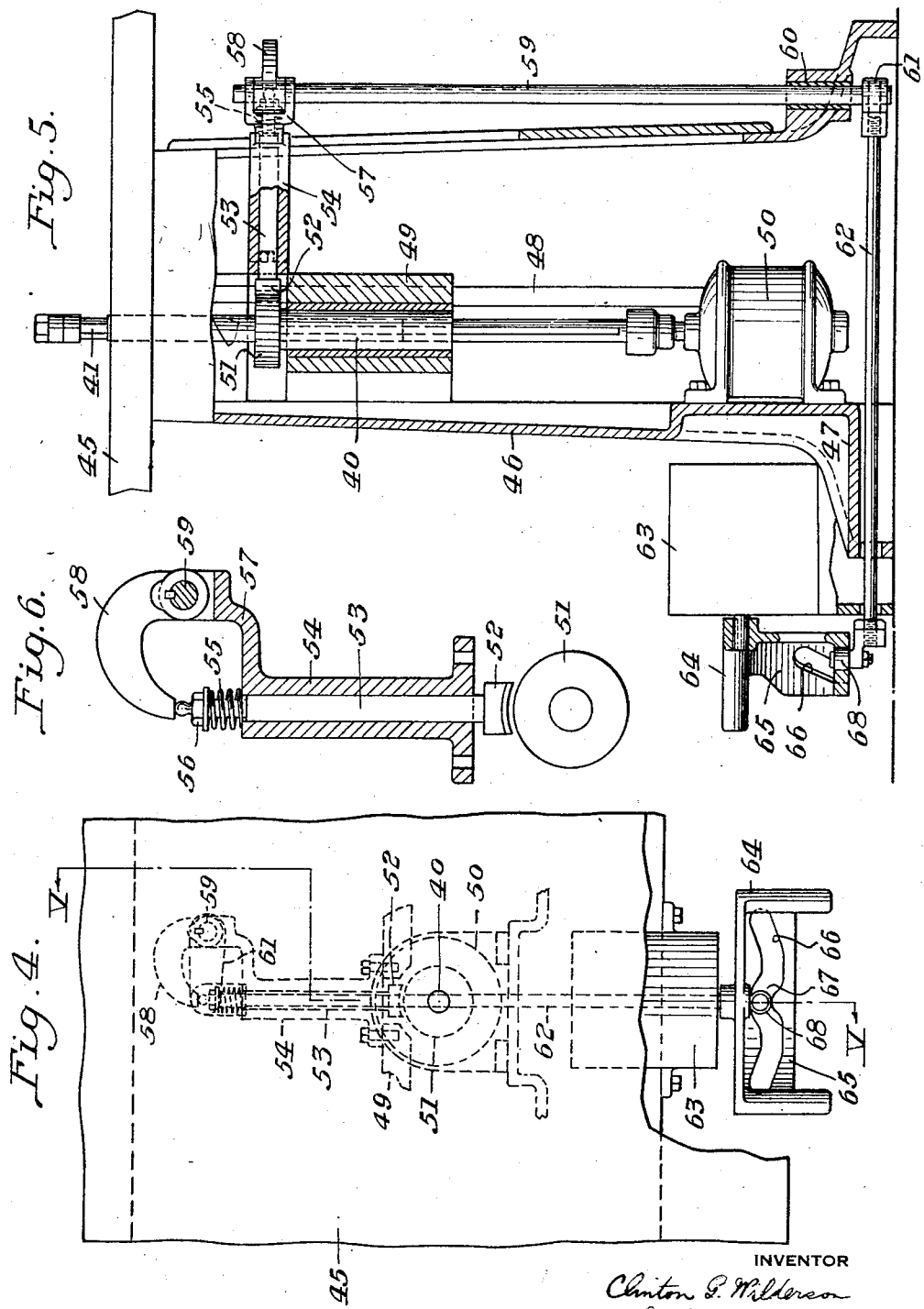

Patented May 10, 1932

1,857,905

UNITED STATES PATENT OFFICE

CLINTON G. WILDERSON, OF LEETONIA, OHIO; THE GUARDIAN TRUST COMPANY, OF CLEVELAND, OHIO, AND MYRNA WILDERSON EXECUTORS OF SAID CLINTON G. WILDERSON, DECEASED

CONTROL MECHANISM

Application filed June 18, 1930. Serial No. 461,983.

My invention relates to an apparatus for controlling machines and, in particular, to a means for controlling the operation of shafts or spindles in machine tools of well known construction.

In machine tools making use of reversing motor driven spindles, it has been found that, when the motor is shut down, considerable time is required for the spindle to slow down and stop. This is due, or course, to the considerable inertia of the spindle and associated rotating parts. This delay represents a dead loss in operations requiring frequent changing of the cutting tools carried by the spindle. Another disadvantage is that, if the cutter is to be reversed, damage to the driving motor may result if the control switch therefor is reversed before the motor has stopped. Idling spindles, furthermore, present a serious potential hazard to the operators of tools of the type mentioned.

In order to remedy the foregoing objections to machine tools as at present constructed, I have invented a novel means for applying a brake to a spindle or other rotary member driven by a motor, when the control switch for the motor is shifted to the off position. In accordance with the invention, a motor driven tool having a rotary spindle and a reversing switch for the motor, is provided with a treadle or other operating means for the switch. A brake drum is mounted on the spindle, and a brake shoe is provided for engagement with the drum. Operative connections between the brake shoe and the motor switch cause the shoe to engage the drum whenever the reversing switch moves from either of its operating positions to the neutral, or off, position. The brake is thus applied as soon as the motor is shut down, and all rotating parts are quickly brought to a standstill.

In another form of the invention, I provide brake actuating mechanism such that the brake is initially applied when the motor is shut down after operating in either direction, and subsequently removed to permit manual shifting of the spindle to permit convenient change or adjustment of the cutting tools.

For a complete understanding of the invention, reference is made to the accompanying drawings illustrating preferred embodiments of the invention. In the drawings, Figure 1 is a partial top plan view, with portions broken away, of a single spindle shaper having the invention applied thereto;

Figure 2 is a sectional view of Figure 1 along the line II—II thereof;

Figure 4 is a view similar to Figure 1, showing a modified form of the invention;

Figure 5 is a sectional view of Figure 4 on the line V—V thereof; and

Figure 6 is an enlarged view, showing details of the construction.

Figure 1:
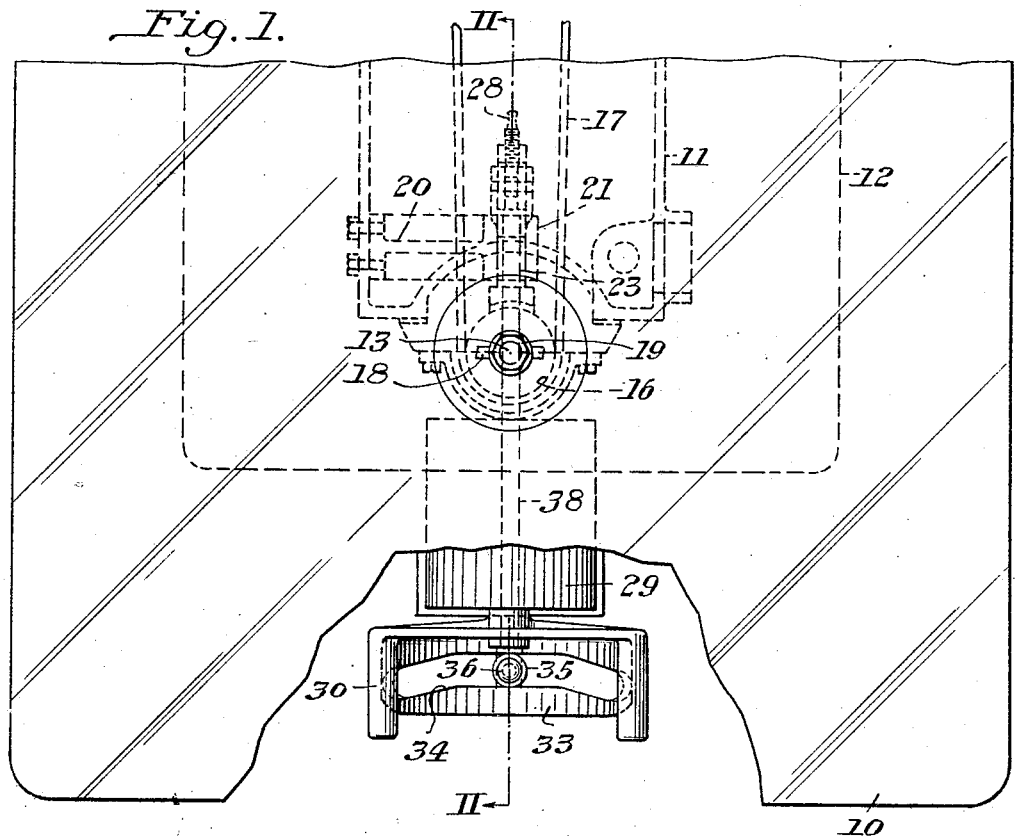
Figure 3:
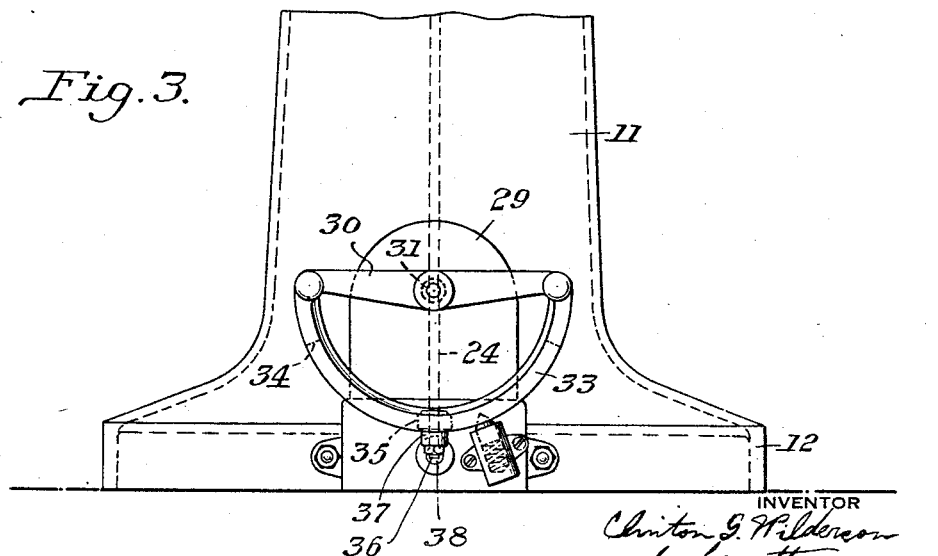
Figure 3 is a partial side elevation showing the reversing switch and its operating treadle.

Referring in detail to the drawings, and in particular to Figures 1 through 3, I have illustrated the invention as embodied in a single spindle shaper having a table 10 supported on a standard 11 having a base portion 12. A cutter spindle 13 is journaled in suitable bearings 14 and 15 carried on a slide adjustably secured to the standard 11, and projects through the table 10 to engage material supported thereon.

A pulley 16 is mounted on the spindle 13, and a belt 17 provides a driving connection between the pulley 16 and an electric motor mounted on an extension of the base 12 (not shown). The spindle 13 carries cutters 18 which may be removed or adjusted by loosening a nut 19 threaded on the reduced end of the spindle.

A bracket 20 is bolted to the inside of the standard 11 and has a projecting arm 21 and a lug 22. The arm 21 provides a sliding support for a reciprocable brake shoe 23 adapted to engage the upper portion of the pulley 16. A lever 24 is pivoted to the lug 22 and carries a pivoted head 25. The upper end of the head 25 enters a hole 26 in the outer end of the brake shoe 23. A spring 27 resiliently maintains the lower end of the head 25 close to the lever 24. An adjusting thumb screw 28 permits adjustment of the relative positions of the head 25 and the lever 24.

A reversing switch of known construction for driving the motor (not shown) is indicated at 29. This switch is adapted to be operated by a treadle 30 secured to a shaft 31 projecting into the reversing switch 29 and carrying the moving portions thereof. The reversing switch 29 is mounted on an extension 32 of the base 12. The treadle 30 has a dependent semicircular portion 33 which is provided with a cam slot 34. A roller 35 mounted on a pin 36 serves as a follower and rides in the cam slot 34. The pin 36 is supported on a bracket 37 carried by a rod 38 which slides in suitable openings in the base 12 and the extension 32. The rod 38 has a pivotal connection 39 with the lever 24.

The reversing switch 29 and treadle 30 are shown in the neutral or off position. The motor driving the spindle 13 is adapted to be operated in either direction by moving the treadle 30 clockwise or counter-clockwise to make the proper contacts within the reversing switch.

As illustrated in Figures 1 and 2, the brake shoe 23 is in engagement with the upper portion of the pulley 16. The pulley 16 is thus locked and rotation of the spindle 13 is prevented. If the treadle 30 is now shifted in either direction to cause rotation of the spindle in the desired direction, the movement of the depending semicircular portion of the treadle 30 will, through the cam slot 34, cause the follower roller 35 and the rod 38 to be moved to the left as viewed in Figure 2. This movement of the rod 38 will shift the lever 24 slightly in a clockwise direction and the head 25 carried thereby will tend to withdraw the brake shoe 23 from engagement with the surface of the pulley 16. The connection between the lever 24 and the brake shoe is not a rigid one, but is resilient because of the pivotal mounting of the head 25 and the extensibility of the spring 27. The spring 27, however, is strong enough to insure that the brake shoe will be withdrawn from the pulley when the lever 24 is shifted. The adjusting screw 28 makes it possible to vary the pressure exerted by the brake shoe 23 on the pulley 16 when the treadle 30 is in neutral position.

The movement of the treadle 30 to either of the operating positions of the switch 29 will thus cause the brake shoe to be withdrawn from the pulley 16 which serves as a brake drum. Obviously a reverse movement of the treadle will cause the application of the brake shoe as a result of the movement of the rod 38 toward the right. The lever 24 is thereby shifted counter-clockwise and through a rigid connection including the adjusting screw 28 carried by the head 25, positively forces the brake shoe into engagement with the pulley 16. The spindle and all rotating parts of the machine are thus stopped very promptly after the supply of electric energy to the driving motor has been interrupted.

In a modified form of the invention shown in Figures 4 through 6, I provide for the initial application of a brake when the motor is shut down, but also cause the brake to be subsequently released so that the spindle may be shifted manually for ease in changing or adjusting cutters. In this form of the invention, the device comprises a table 45, a standard 46 and a base 47. The standard 46 is provided with guides 48 on which a reciprocable slide block 49 is carried. A motor 50 is disposed within the standard and has a splined connection to a spindle 40 carrying cutters 41, above the surface of the table 45. The spindle also carries a brake drum 51 which is adapted to be engaged by a brake shoe 52. The brake shoe 52 is formed integrally with a bar 53 which is slidably mounted in a bracket 54 secured to the standard 46. A spring 55 between the end of the bracket 54 and a nut 56 threaded on the reduced end of the bar 53 tends to maintain the brake shoe 52 out of engagement with the brake drum 51.

An extension 57 of the bracket 54 provides a bearing for a rotatable finger 58 splined to a shaft 59. The shaft 59 is journaled in a bearing 60 in the base 47 and carries at its lower end a crank 61 keyed thereto. The crank 61 is pivoted to a rod 62 which passes laterally through the base 47.

A reversing switch 63 for the motor 50 and a treadle 64 for operating the switch are similar to corresponding elements in the previously described modification, with the exception that the treadle 64 has a depending semicircular portion 65 provided with a cam slot 66 having a re-entrant portion 67 at the middle thereof. A roll follower 68 rides in the slot 66 as previously described. As shown in Figures 4 through 6, the treadle 64 is in the neutral position and the brake shoe 52 is maintained out of engagement with the drum 51 by the spring 55. When the treadle 64 is shifted in either direction, however, the follower 68 moves to the left as seen in Figure 5, and, through the rod 62, crank 61, shaft 59 and the finger 58, causes the brake shoe 52 to engage the drum 51. As the treadle is shifted further, however, the roll follower 68 moves toward the right and releases the brake. The switch 63 is preferably designed so that the motor circuits will not be closed until the brake has thus been released preparatory to starting operations.

When the desired operation has been effected, the motor may be stopped by shifting the treadle 64 back toward the netural position. The first result of this operation will be to cause an application of the brake 52, since the cam slot 66 forces the follower 68 and the rod 62 toward the left. The crank thus causes a counter-clockwise rotation of the shaft 59 and the finger 58 forces the brake shoe 52 against the drum 51.

As the treadle is shifted further toward the neutral positon, however, the re-entrant portion 67 of the slot 66 causes a reverse movement of the brake operating mechanism to release the brake. The sequence of operation, therefore, in stopping, is an initial application of the brake to stop the motor and rotating parts followed by a release of the brake to permit manual adjustment of the spindle for the purpose of changing cutters.

The advantages resulting from the invention described will be apparent to those skilled in the art, and include the fact that the spindle of a machine tool may be stopped promptly when the motor is shut down. All loss of time in waiting for the spindles to idle to rest, is eliminated, and possible hazard to the workman from the idling spindles is avoided. In addition, the electrical equipment is protected, since it is impossible to reverse the driving motor without first stopping the rotating mechanism connected therewith.

Although I have described and illustrated only two preferred embodiments of the invention, other embodiments may be designed within the scope of the appended claims, and any changes in the invention as illustrated may be made without departing from the spirit thereof.

I claim:

1. The combination with a device having a spindle, and a reversible driving motor therefor, of a reversing switch for the motor and means operated by movement of said switch to the off position for initially applying a brake to the spindle and then releasing it.

2. In a motor driven device, a brake therefor, and a multiposition control switch, means actuated by movement of the switch to off position for initally applying said brake and subsequently releasing it.

3. In a machine tool, a vertical shaft having a driving motor, a reversing switch for the motor including a horizontal shaft, a brake for stopping the vertical shaft, a treadle for operating the reversing switch shaft, and cam and link mechanism connecting said treadle and brake to stop the vertical shaft when said switch is moved to off position.

4. The combination, in a motor driven device, with a reversing switch for the motor and a brake for the device, of a treadle for operating the switch having an arcuate portion with a cam slot therein, a roller in said slot, and means connected thereto for actuating the brake.

5. A combined brake and motor controlling device comprising a treadle for actuating a motor reversing switch shaft, said treadle being fixed to said shaft and having a semi-cylindrical portion with a cam slot therein, a follower within the slot, and means actuated thereby for setting the brake.

6. A combined brake and motor controlling device comprising a treadle for actuating a motor reversing switch shaft, said treadle being fixed to said shaft and having an arcuate portion with a cam slot therein, a follower within the slot, and linkage actuated thereby for operating the brake.

7. A combined brake and motor controlling device comprising a treadle for actuating a motor reversing switch shaft, said treadle being fixed to said shaft and having a semi-cylindrical portion with a cam slot therein, a follower within the slot, and means actuated thereby for setting the brake, said slot being shaped to cause initial application and subsequent release of the brake on movement of the switch to open position.

8. A combined brake and motor controlling device comprising a treadle for actuating a motor reversing switch shaft, said treadle being fixed to said shaft and having an arcuate portion with a cam slot therein, a follower within the slot, and linkage actuated thereby for operating the brake, said slot being shaped to cause initial application and subsequent release of the brake on movement of the switch to open position.

In testimony whereof I have hereunto set my hand.

CLINTON G. WILDERSON.